July 4, 1950 — R. H. STITT — 2,513,972

ORNAMENTAL TILE

Original Filed Aug. 14, 1941

INVENTOR.
Roger H. Stitt.
BY Thiess, Olson & Mecklenburger
Attys.

Patented July 4, 1950

2,513,972

UNITED STATES PATENT OFFICE 2,513,972

ORNAMENTAL TILE

Roger H. Stitt, Long Lake, Ill., assignor to United States Gypsum Company, Chicago, Ill., a corporation of Illinois Original application August 14, 1941, Serial No. 406,921. Divided and this application January 26, 1944, Serial No. 519,781

5 Claims. (Cl. 72—18)

This invention relates to decorative wall coverings and more particularly to acoustical coverings such as surface decorated acoustical tile and the like.

This application is a division of my co-pending application Serial No. 406,921, filed August 14, 1941; now Patent No. 2,388,880.

It is an object of the invention to provide a surface decorated acoustical tile wherein the entire tile, including the decorative surface, is formed of a composition similar, for instance, to that disclosed and claimed in the King and Stitt Patent No. 1,769,519, King Patent No. 1,996,033, Roos Patent No. 1,996,032, and King Canadian Patent No. 421,940, of Aug. 8, 1944. These patents disclose acoustical tile which have a stone-like appearance and structural rigidity and are characterized by connected porosity and varying degrees of hardness.

Inorganic fibrous material, such as mineral wool, glass wool, rock wool, etc., is preferable for the compositions from which these tile are made because of its high sound-absorbing qualities, its noncombustible and verminproof nature, and its characteristic of producing a structure of stone-like appearance. Other fibrous materials may, however, be substituted for the inorganic fibers, such, for instance, as wood, or other cellulosic fibers, or other lightweight fibrous material. These fibers are caused to adhere to each other to form a coherent substantially rigid structure by means of a suitable binder, such as sodium silicate, or an organic binder including starch, plaster, size, and preservatives. Thus, the binders disclosed in the above-mentioned patents may be used. A suitable composition may consist of the following:

| | Pounds |
|---|---|
| Water | 4100 |
| Fiber | 500 |
| Starch | 210 |
| Gypsum plaster | 100 |
| Wax emulsion size | 35 |
| Boric acid | 15-30 |
| Beta-naphthol | 0.4 |

The wax size is a paraffin emulsion made either from saponified montan wax or by other known methods for producing such emulsions.

In the manufacture of acoustical tile of the nature disclosed, for instance, in the above-identified patents, the composition is preferably spread upon a coarse open mesh burlap placed in a mold having a perforated bottom. After the mold is filled, the top is screeded smooth and the whole is dried in a kiln. After drying, the tile is removed from the mold and the pores at the back of the tile are opened up by stripping off the burlap, which stripping removes a light surface skin formed during the drying process. The tile then may be trimmed, trued up, and otherwise worked in a fashion similar to wood. The front surface which was not opened up by burlap is also removed, for example, by a sanding roll or similar device. The resultant tile is usually made from ½ inch to one inch thick and is of light weight, about ¾ pound to 1½ pounds per square foot, is rigid and of such connected porosity that it readily absorbs incident sound waves. It is of nonuniform internal structure, some parts being harder than others.

The artificial stone-like appearance of the surface of the tile produces a pleasing effect as the surface is somewhat broken up in appearance by the nonuniform arrangement of pores and small irregular openings or pits of nonuniform size and shape. Some of these openings are very small and others are distinctly cavernous. The tile may be attached to wall and ceiling surfaces by means of adhesives such as linoleum cement or casein glue preparations and may be applied directly to the surface of the wall or to furring strips.

It is an object of the present invention to provide tile similar to those described and having a surface decoration which will greatly enhance the decorative appearance of the finished wall or ceiling and in which the decoration forms an integral part of the tile itself.

A further object is the production of surface decorated acoustical tile in which the decoration is provided by means of harmoniously related areas of nonuniform striae of irregular and nonuniform depth, width, and relationship and in which the striations of any single related area all extend in the same general direction; also in which all of the areas may combine to produce a harmonious design.

The invention also contemplates the surface decoration by means of striations of the type described, all extending in the same general direction throughout the entire area of individual tile in a wall or ceiling and in which the striations of adjacent tile may be in different directions. The tops of the striations are all substantially in the same surface plane, although slightly roughened and scored. The main striations, grooves, or furrows, although extending in substantially the same direction in any one area, are irregular in outline, both longitudinally and transversely, are of tortuous extent, and coincide at various points. They are only sufficiently deep to provide closely adjacent nonuniform small shadows so that the individual areas vary in appearance from shaded striated areas of darker tone to areas of light tone having a slightly roughened appearance. The texture appearance and the degree of brilliance of the different areas change in accordance with changes in the position of the observer and with changes in the direction of light against the wall or ceiling.

It is a further object to provide tile of the character described in which decoratively related areas are striated in different directions in accordance with the requirements of the design and in which unstriated portions of the surface of the tile may form an integral part of the surface decoration.

Another object is to provide a surface decorated acoustical tile of the character described in which the decoration is preformed in the face of the tile and in which the tile will be cheap to manufacture and easy to install and will present a pleasing and changeable appearance, depending upon the position of the observer and the angle of the light projected against the wall.

Further objects will be apparent from the specification and the appended claims.

Figure 1:
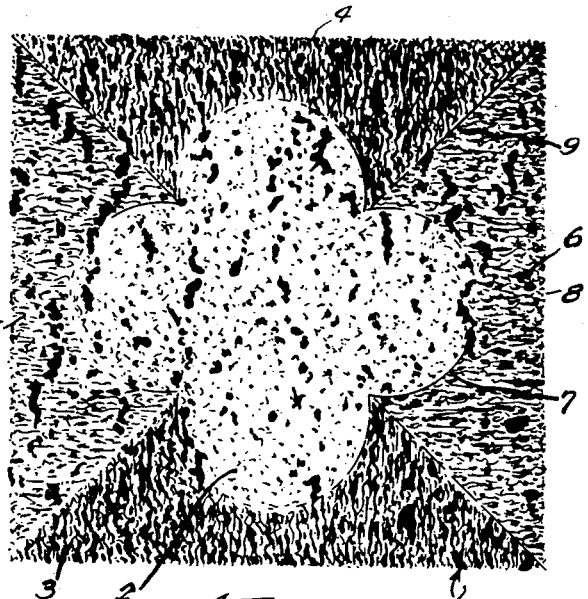
Fig. 1 is a plan view of the surface of a single acoustical tile decorated in accordance with this invention and having related areas striated in different directions and a central associated undecorated area forming a part of the general design.
Figure 2:
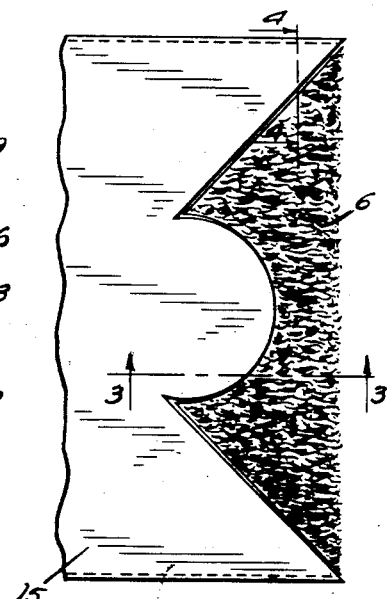
Fig. 2 illustrates the method of using a template in forming a surface decoration such, for instance, as shown in Fig. 1.

Referring to the drawings in detail, the embodiment illustrated comprises a wall covering which may be in the form of tile, rectangular or otherwise, such, for instance, as described in connection with the previously mentioned patents. One of these tile is illustrated in Fig. 1 and this tile 1 is provided with a surface decoration comprising a central undecorated portion 2 which may be of any desired shape to produce the required design. The border areas 3, 4, 5, and 6 are decorated with nonuniform striations such as previously described, the striations in the opposed areas all extending generally parallel toward a central vertical plane of the tile. As previously stated, these striations are in the form of tortuous nonuniform furrows or grooves having more or less precipitous walls of fantastic and irregular formation. They are winding narrow steep-sided gulleys separated by narrow serrate divides, and, in the particular design shown in Fig. 1, these gulleys are all tributary to a normal central zone, the tops of the striations being all substantially in the plane of the central area so that the tile has a generally flat appearance, but with varying contrast of design elements.

The tile may be assembled to form a single repeated pattern distributed over a ceiling or the like and in which the dark and light areas of the pattern automatically interchange in position or vary in reflected light intensity with a change in the position of the observer or with a change in the direction of the light, or both. This provides a soft harmonious arrangement of lights and shadows which, if desired, may be blended into an intricate pattern of harmonious tone values not previously obtained in the art.

The central area 2 of the panel shown in Fig. 1 is bounded by a small groove 7, this groove being sufficiently pronounced to clearly outline the design and preferably fading somewhat adjacent the central point 8 of the design to form only a faint outline. The individual striated areas are also outlined by means of rather prominent grooves 9.

Figure 3:
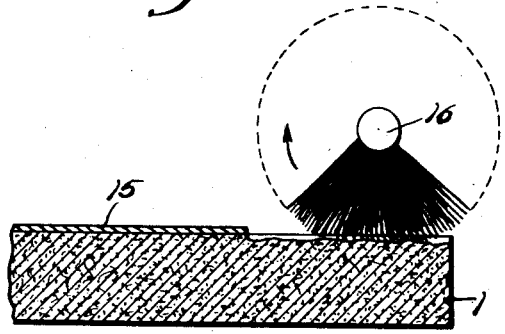
Fig. 3 is a detail sectional view taken longitudinally of the striations and on a line substantially corresponding to line 3—3 of Fig. 2.
Figure 4:
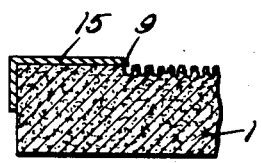
Fig. 4 is a detail sectional view taken transversely of the striations and on a line substantially corresponding to line 4—4 of Fig. 2.

The method of producing the striations is illustrated in Fig. 3. This is accomplished by brushing the exposed surface of the tile with a suitable brush, preferably of wire, and in which the wire bristles are sufficiently rigid to remove the softer portions of the composition of the tile and sufficiently flexible to be turned aside by the harder portions of the tile, so that a plurality of the bristles will follow each other through the grooves to thereby provide the striated appearance previously described. The brush used may be a rotary brush 16, under which the tiles are moved, or which may be moved over the tile. The brushing should be accomplished toward the template or stencil 15. The brush 16 should be rotated in the direction of the arrow so that the material from the striations is brushed onto the stencil.

Figure 5:
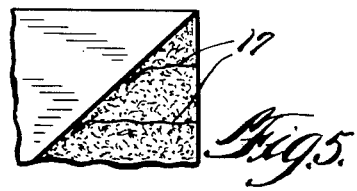
Fig. 5 is a top plan view of a portion of the tile and template shown in Fig. 2 and illustrates the direction of movement of the brush strands or bristles at the edge of the template to form the defining grooves between the related areas of the design.

The grooves 7 and 9 outlining the design are formed by the bristles striking the angular edge of the stencil or template and being turned in the direction of such angular edge. This is illustrated in Fig. 5, in which the areas 17 illustrate the path of the bristles in forming the groove 9. It will be apparent that the groove will be less pronounced where the edge of the template is at a right angle to the direction of movement of the bristles. This, however, is an advantage, as a more pleasing design is obtained when such portions of the grooves fade out as illustrated at 8 in Fig. 1.

The template or stencil 15 may, of course, be made in accordance with any design which it is desired to apply to the tile, and the individual surfaces in which the striations run in different directions may be separately covered and separately brushed. The stencil is preferably of thin gauge metal laid snugly over the face side of the tile and the entire area is then wirebrushed. The exposed areas not covered by the stencil pattern are then grooved with wavy, broken, and irregular lines that run in the same general direction on a unit area. Although the tile is all of one color, the pattern is clearly discernible because the grooving causes the tile on the various differently positioned areas to appear to be of different texture. Also, the light is deflected differently on grooves running in different directions or between grooves and the portion of the tile not grooved. The grooved texture appears natural instead of mechanical, because the bristles or fibers of the brush are sufficiently flexible to bend slightly and divert their path vertically and laterally as soft and hard portions of the tile are encountered. Thus, the lines in a unit area will run generally in the same direction. Some of them will coincide. They will all be slightly wavy. Their depth will vary, and they will not follow a definite pattern. The grooving will not be identical in any separate areas, and the pattern may be clearly outlined by means of more uniform grooves caused by the deflection of the fibers or bristles against the stencil.

It has been found that the methods of surface decoration herein described do not materially interfere with the sound absorbing characteristics of the tile. This is important, as sound absorption is the main consideration in the manufacture of tile of this type. It has been found also that, in applying paint to the tops of the striations, the paint does not enter materially into the grooves or other openings in the tile and the porous qualities of the tile, in so far as sound absorption is concerned, are not materially interfered with.

Figure 6:
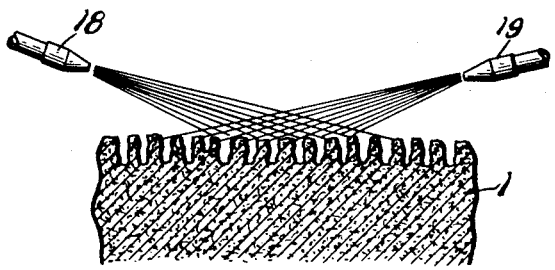
Fig. 6 is an enlarged sectional view through the striations of one of the decorated tile and illustrates a method of coloring the striations in order to produce changeable color effects in a ceiling or wall.

Fig. 6 illustrates another method of decorating the striated portions of the tile. In this embodiment, a suitable color is sprayed onto the tile and directed at 90 degrees from the general directon of the striations and at a comparatively low angle against the striated surface. One color may be applied in one direction from a nozzle 18 and a different color may be applied to the opposite side of the striations from an oppositely disposed nozzle 19. It will be apparent that in this manner the opposite sides of the striations may be tinted or colored as desired, preferably with stain, so that the pores are not filled and only one tint will be visible from one side of the tile, and these tints will apparently change in accordance with the change in position of the observer.

It is intended, of course, that the invention should not be limited to the specific embodiment or embodiments disclosed herein, since modifications may be made, and it is contemplated, therefore, by the appended claims to cover any such modifications as fall within the true spirit and scope of this invention. It will, moreover, also be apparent that, where acoustical correction is of no moment, the invention may be applied to tile which do not absorb any great amount of sound, as the artistic effect is quite independent of the sound absorption, although the surface structure and the internal structure of the preferred embodiment disclosed herein cooperate to provide the desired light-reflecting and sound-absorbing characteristics in a single title structure without introducing any new element in the structure or in the composition of the tile.

Having thus described this invention, what I claim and desire to be secured by Letters Patent is:

1. An acoustical tile of dry, crumbly, abradable material comprising a dry pulverizable composition of stone-like appearance and structural rigidity, characterized by the presence of interconnected pores and varying degrees of hardness throughout and having a substantially flat surface, selected areas of said surface having nonuniformly and irregularly striated grooves, each groove having a minutely jagged surface pitted with broken-open pores the material between said grooves containing, in general, a greater proportion of the harder material than the proportion of the harder material contained in the rest of the tile, the striated and unstriated areas together forming a predetermined design, said surface having narrow substantially uniform grooves outlining the design, all of the striations of any single outlined area extending in the same general direction and being of sufficient depth and uniformity of distribution to provide varying contrasting tone values between the striated and unstriated surfaces in accordance with varying points of observation and varying angles and intensity of illumination.

2. A sound-absorbing wall tile of dry, nonplastic, crumbly, abradable material comprising a thoroughly dried slab of a composition comprising particles of fibrous material and a binder, said slab being characterized by dry stone-like appearance, by the presence of interconnected pores and varying degrees of crumbly hardness throughout, said tile having a surface finish formed of the harder crumbly material and being grooved to provide closely adjacent nonuniform striae and tributary striae of irregular depth, width and relationship with the tops of the divides substantially in the normal surface plane, each groove having a minutely jagged surface pitted with broken-open pores, the striae and tributary striae of any single area all extending tortuously and nonuniformly in the same general direction, and in different directions in individual decoratively associated areas.

3. An acoustical tile composed of an acoustical composition of stone-like appearance and structural rigidity and characterized throughout by closely adjacent portions of soft and hard material, provided with a surface ornamentation consisting of comparatively deep nonuniform striations of unequal depth, width and tortuous contour, with the tops of the divides between said striations substantially in the normal surface plane of said tile.

4. An acoustical tile made of a composition containing a major portion of mineral wool, gelatinized starchy binder and gypsum plaster, characterized by its stone-like appearance and structural rigidity and having interconnected pores through the entire composition and also by having closely adjacent minute portions of varying degrees of hardness, said tile being provided with a surface ornamentation formed of distinct areas of irregular striae extending in any given area, in the same general direction, said striae being of irregular depth and width and of tortuous contour, with the tops of the striation divides substantially in the normal surface plane of said tile.

5. An acoustical tile composed of an acoustical composition of stone-like appearance and structural rigidity composed of a fibrous material bonded by means of a binder, and having a nonuniform internal structure consisting of harder and softer portions, said tile being provided with a surface ornamentation formed of distinct areas of irregular striae extending, in any given area, in the same general direction, said striae being of irregular depth, width and of tortuous contour, with the tops of the striation divides substantially on the normal surface plane of the tile.

ROGER H. STITT.

REFERENCES CITED

The following references are of record in the file of this patent:

UNITED STATES PATENTS

| Number | Name | Date |
|---|---|---|
| 289,811 | Cheesman | Dec. 11, 1883 |
| 420,929 | Church | Feb. 11, 1890 |
| 449,675 | Hoke | Apr. 7, 1891 |
| 649,978 | Buyten | May 22, 1900 |
| 800,931 | Meeker | Oct. 3, 1905 |
| 1,293,076 | Fritzinger | Feb. 4, 1919 |
| 1,431,917 | Antaramian | Oct. 17, 1922 |
| 1,554,180 | Trader | Sept. 15, 1925 |
| 1,633,563 | Abbott | June 28, 1927 |
| 1,778,345 | Venzie | Oct. 14, 1930 |
| 1,804,753 | Douglas | May 12, 1931 |
| 1,875,074 | Mason | Aug. 30, 1932 |
| 1,910,844 | Little | May 23, 1933 |
| 1,946,914 | New | Feb. 13, 1934 |
| 1,996,032 | Roos | Mar. 26, 1935 |
| 1,996,539 | Dufay | Apr. 2, 1935 |
| 2,037,995 | New | Apr. 21, 1936 |
| 2,042,487 | Sloan | June 2, 1936 |
| 2,052,517 | Roos | Aug. 25, 1936 |
| 2,162,777 | Hogopian | June 20, 1939 |
| 2,165,101 | Hudson | July 4, 1939 |
| 2,286,068 | Deskey | June 9, 1942 |
| 2,388,880 | Stitt | Nov. 13, 1945 |